Aug. 23, 1955    C. A. LAUGHLIN    2,716,147
COVER CONSTRUCTION FOR STORAGE BATTERIES
Filed May 21, 1953
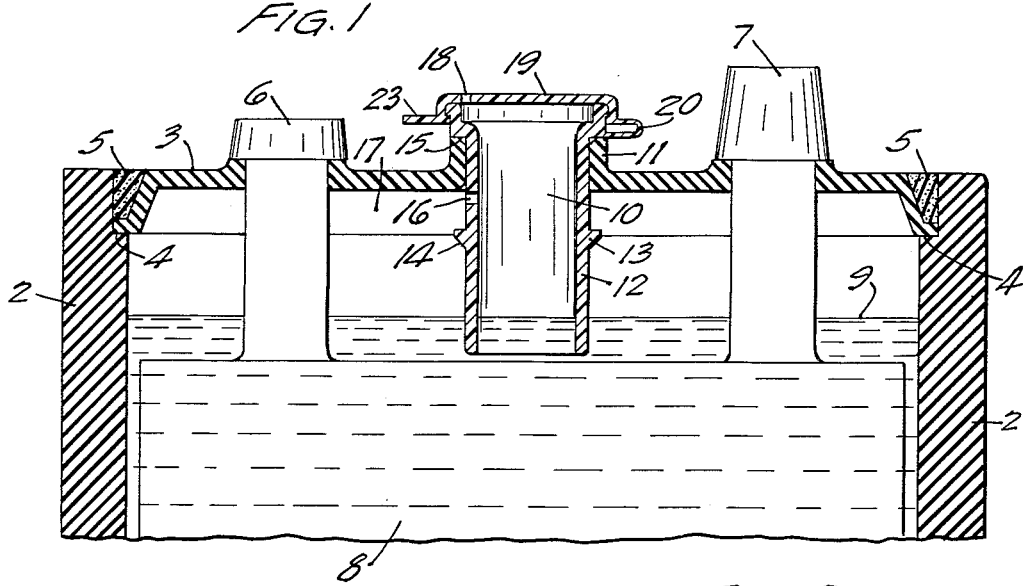
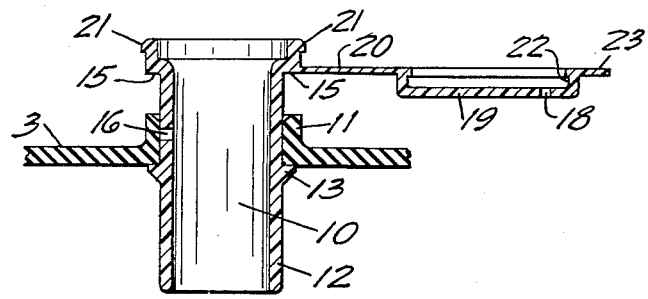
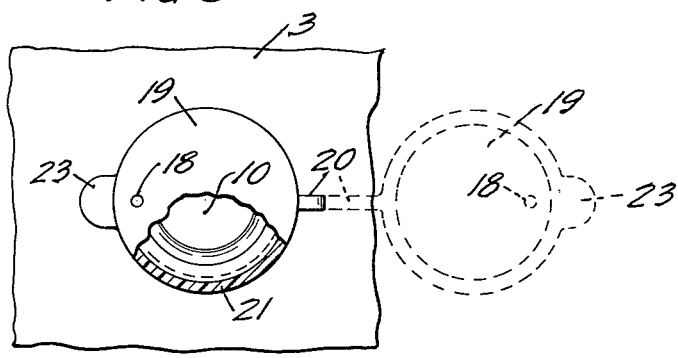
INVENTOR.
Clayton A. Laughlin
BY
Harold J. Kinney
ATTORNEYS

.

United States Patent Office 2,716,147
Patented Aug. 23, 1955

2,716,147

COVER CONSTRUCTION FOR STORAGE BATTERIES

Clayton A. Laughlin, Minneapolis, Minn., assignor to Northwest Plastics, Inc., St. Paul, Minn., a corporation of Minnesota Application May 21, 1953, Serial No. 356,333

1 Claim. (Cl. 136—177)

This invention relates to storage batteries and provides therefor a novel cover construction by means of which it may readily be determined when a proper quantity of water has been added to the battery cell. The construction also includes within it a novel valve means for venting from the battery gases which normally accumulate therein. The invention further provides a cap for the filler opening on a storage battery, which cap need not be removed from the battery top in order to expose the filler opening.

Other and more detailed advantages of the invention will appear from the following specification, and the accompanying drawings, in which latter:

Figure 1 is a fragmentary vertical cross-sectional view of a battery provided with the cover construction of this invention.

Figure 2 is a vertical cross-section of the cover construction in raised position.

Figure 3 is a plan view of the cover construction with the cap therefor shown in open position by the broken lines.

As is well known, the water in storage battery cells must be replenished from time to time. For that purpose, storage batteries are customarily provided with one or more filler openings upon their upper surface through which the water may be poured. Such filler openings are normally fitted with a plug or threaded stopper which, of course, must be removed during the filling operation. It sometimes happens that this plug is mislaid or dropped into some inaccessible place during the filling procedure, and it is one object of this invention to provide a cap which need not be bodily removed from the battery top in order to fill the cell.

In many conventional batteries, it is difficult to determine when the desired amount of water has been added thereto, and it is an object of this invention to remedy this defect so that it can be visibly determined when the water in the battery has been replenished to the proper level. This invention also provides means whereby gases which normally accumulate within the battery may be vented to the atmosphere.

Referring now to the drawings in more detail, reference character 2 indicates a hard rubber case within which the battery construction proper, and the electrolytic fluid, etc. is contained. Said case is provided with a cover 3 which rests upon shoulders 4 of the case and is there secured by a suitable sealing compound 5.

Projecting upwardly from the top of the case are inter-cell connector 6 and binding post 7 to which latter, in use of the battery, an electric circuit is connected. Said elements 6 and 7 are attached in the usual manner to the electrode of the battery, which, in this case, comprises plate 8. It should be understood that although the battery shown in Figure 1 has only one cell, it could equally well be constructed with any number of cells to obtain the required voltage.

In the battery shown, the water level is at approximately the point where it should be just after filling, and that point is indicated by reference character 9.

Top 3 of case 2 is provided with circular filler opening 10 about which is formed annular flange 11, which projects upwardly from the surface of the battery. Filler tube 12 extends through opening 10 and is fabricated from flexible plastic material such as polyethylene. Said tube is of a diameter which will fit very snugly within opening 10, yet be vertically slidable therein. The periphery of said tube 12 is encircled by ridge 13, which is of greater diameter than filler opening 10. Said ridge is molded integrally with tube 12. By reason of its flexibility, tube 12 may be deformed and forceably inserted into filler opening 10. The lower edge 14 of ridge 13 is sloped to facilitate the passage of said ridge through the filler opening. After insertion into opening 10, tube 12 will thereupon return to its normal shape and fit snugly but slidably against the inner surface of flange 11, which is of sufficient height above the surface of battery top 3 to maintain tube 12 in vertical alignment. The side walls of tube 12 are turned horizontally upward to form shoulders 15 which will bear on the top of flange 11 when tube 12 is advanced downwardly into battery case 2. Tube 12 is thus prevented from being forced completely into the battery. Said tube 12 is sufficiently rigid so that there is no likelihood that it might be accidently or inadvertently deformed, whereby shoulders 15 might be caused to pass over flange 11.

The flat upper surface of ridge 13 will come to bear against the underside of battery top 3 when tube 12 is raised vertically upward and will thus prevent the withdrawal of said tube from filler opening 10 in normal use of the battery: see Figure 2.

Tube 12 is provided with venting aperture 16. Said aperture is located between shoulders 15 and ridge 13. When tube 12 is in lowered position, as shown in Figure 1, said aperture will be open, and provide means for gases given off into area 17 to escape into tube 12 and thence to the atmosphere through vent 18. However, when said tube 12 is in raised position, as shown in Figure 2, aperture 16 will be closed off by flange 11 and thus gas in area 17 will not be able to escape to the atmosphere.

When the battery is being refilled, tube 12 is raised to the position shown in Figure 2. Tube 12 is made of sufficient length that the bottom edge thereof in raised position will then be at the level to which the water in the battery should desirably lie; i. e., the water level within the battery when it is filled to the optimum point. When water is then poured into the battery, it will rise in case 2 to the bottom lip of tube 12, but no higher, because after the open end of tube 12 is sealed off by the rising water, there is no longer any vent for the air in area 17 and its entrapment there will prevent further rise of water in case 2. Additional fluid poured in after water level 9 is reached, will rise in tube 12, rather than in case 2, and will, of course, be visible when it approaches the top of said tube. A visible indication is thus given that the battery has been sufficiently filled.

After the battery has thus been filled, tube 12 is lowered to the position shown in Figure 1, whereupon aperture 16 will be uncovered and permit air in chamber 17 to pass through it. The water rising in tube 12 will thereby be permitted to drop down to water level 9.

Cover 19 is molded integrally with tube 12 and is connected thereto by flexible strip 20. Cover 19 is shown in closed position in Figure 1, and in open position in Figure 2. The upper edge of tube 12 is formed with a flanged lip 21 and cover 19 is provided with recession 22 adapted to receive that lip, whereby cover 19 will be kept securely over tube 12. Tab 23 is provided so that the cap may be easily grasped when removing it from tube 12.

What I claim is:

In combination, a storage battery including a case